Dec. 17, 1935.  J. SCHRAG  2,024,663
TURBINE DRIVE FOR AUTOMOBILES
Filed Jan. 9, 1930  4 Sheets-Sheet 2

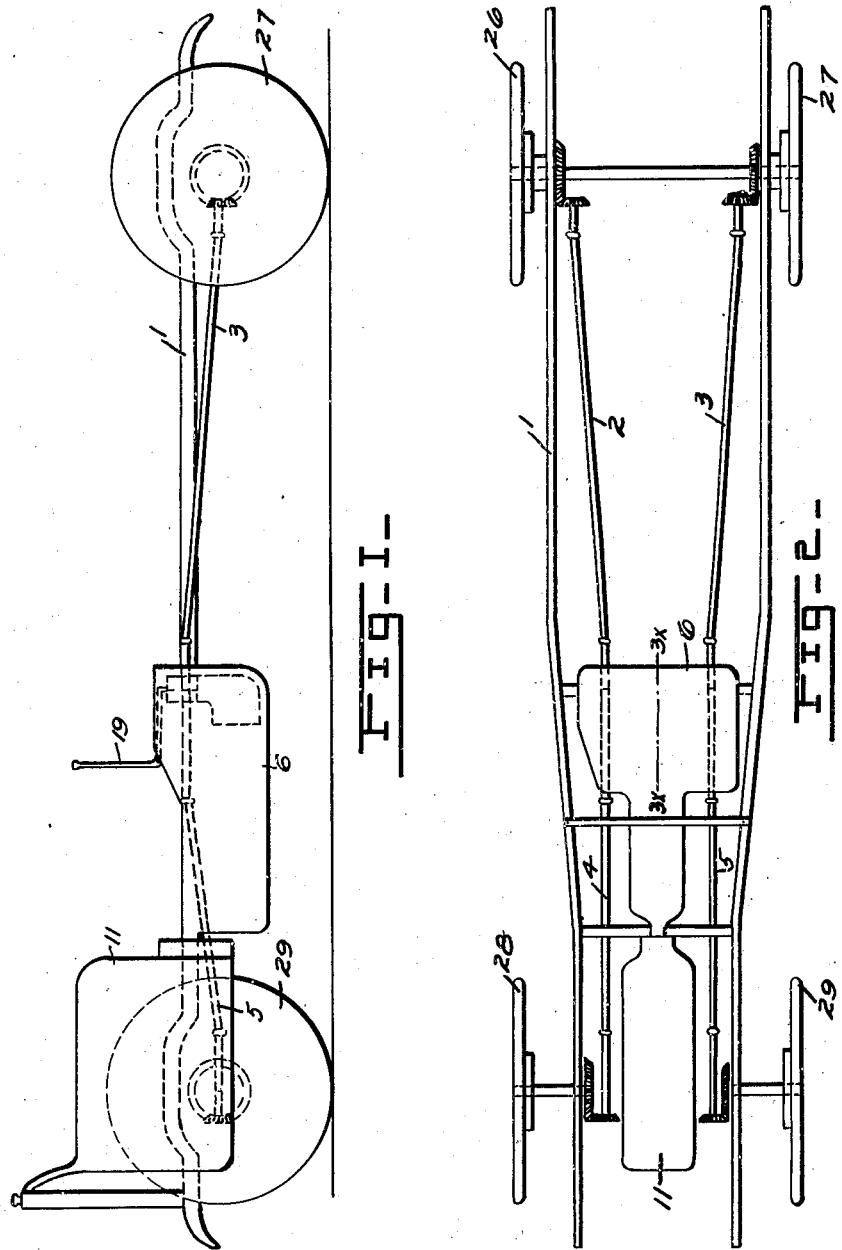

Inventor
JACOB SCHRAG
By Frank Keifer
Attorney

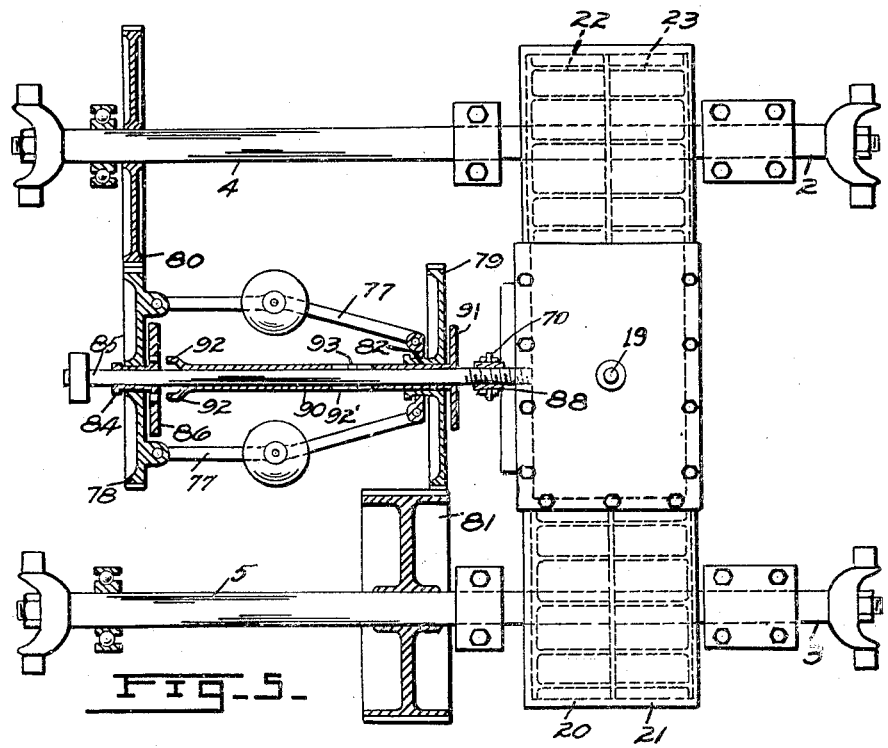
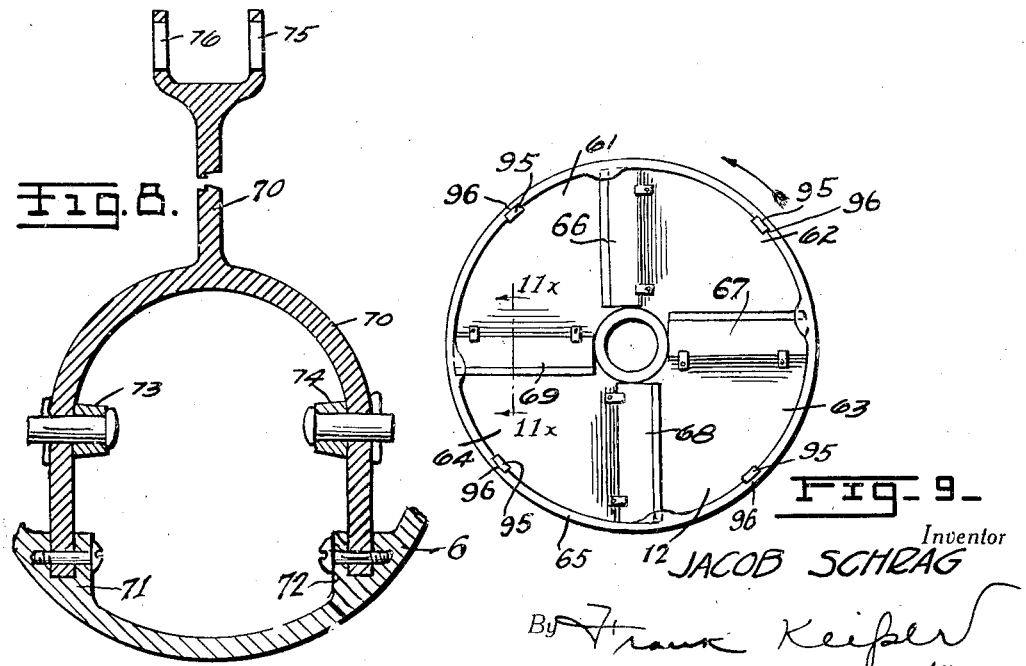

Dec. 17, 1935.  J. SCHRAG  2,024,663
TURBINE DRIVE FOR AUTOMOBILES
Filed Jan. 9, 1930  4 Sheets-Sheet 4
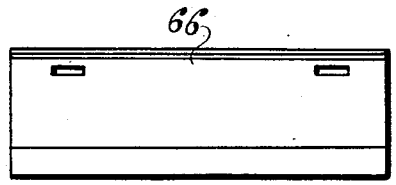
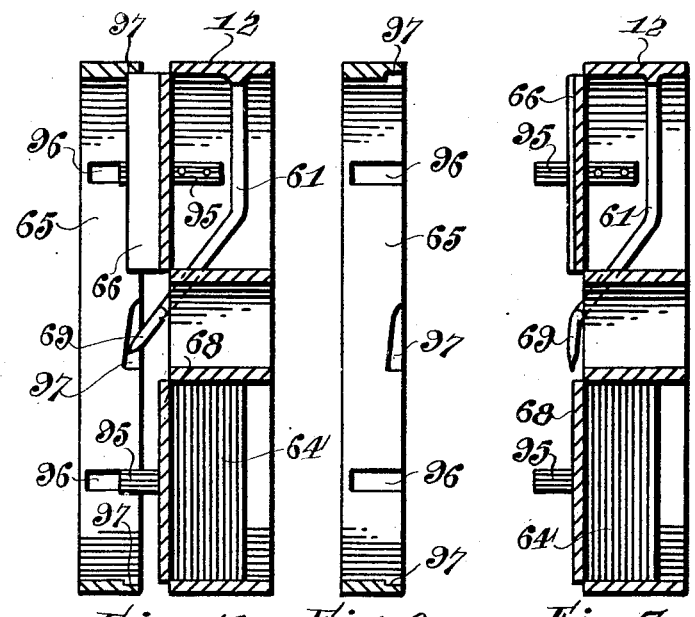
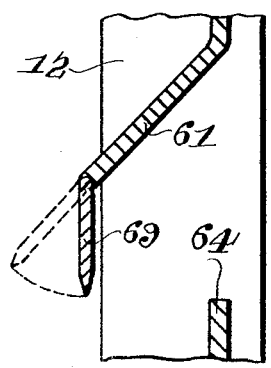
INVENTOR
Jacob Schrag
BY
Frank Kiefer
ATTORNEY Patented Dec. 17, 1935

2,024,663

UNITED STATES PATENT OFFICE 2,024,663

TURBINE DRIVE FOR AUTOMOBILES

Jacob Schrag, Rochester, N. Y.

Application January 9, 1930, Serial No. 420,779

9 Claims. (Cl. 60—54)

The object of this invention is to provide a new and improved method and mechanism of driving the wheels of an automobile.

Another object of the invention is to provide a gear casing containing oil and an impeller for driving said oil through certain passageways which oil is used to drive turbines which in turn drive the wheels of the automobile, the oil being caused to circulate continuously through the impeller and the turbines.

These and other objects of the invention will be illustrated in the drawings, described in the specification and pointed out in the claims at the end thereof.

In the drawings:

Figure 1 is a side elevation of the automobile driven by my invention.

Figure 2 is a top plan view of the gearing by which the automobile is driven with my invention.

Figure 5 is a top plan view of the apparatus shown in vertical section in Figures 3 and 4.

Figure 6 is a sectional detail view of the governing ring.

Figure 7 is a sectional detail view showing the impeller.

Figure 8 is a detail view of the arm that moves the ring that controls the position of the valves in the impeller.

Figure 9 is an elevation of the impeller.

Figure 10 is a vertical section through the impeller shown in Figure 9, with the governing ring thrown out and the valves shown open.

Figure 11 is a section on the line 11x—11x of Figure 9.

Figure 12 is a detail view of one of the valves.

Figure 13 is a detail view of one of the clips by which the valves are held in place on the impeller.

In the drawings like reference numerals indicate like parts.

Figure 3:
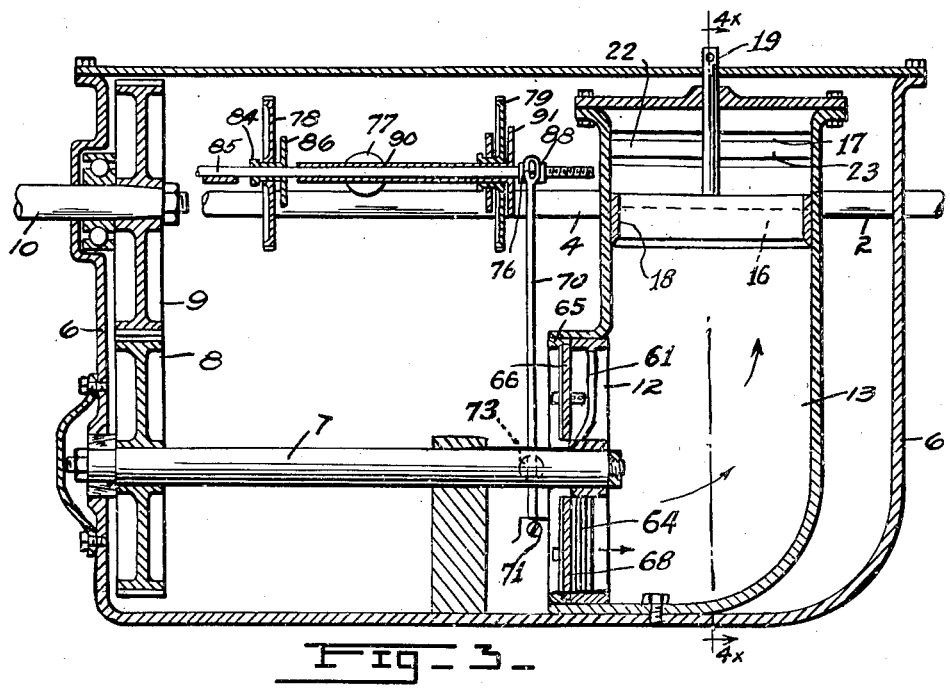
Figure 3 is a section on the line 3x, 3x of Figure 2.

In Figures 1 and 2 reference numeral 1 indicates the chassis of the car, 2 indicates the shaft that drives the right rear wheel, 3 indicates the shaft that drives the left rear wheel, 4 indicates the shaft that drives the right front wheel and 5 indicates the shaft that drives the left front wheel. The mechanism by which these four shafts are driven will now be described.

In Figure 1, 6 indicates a casing having a shaft 7 therein as shown in Figure 3 which at one end is provided with a gear 8 which meshes with a gear 9 which is driven by a shaft 10 which is driven by the engine 11 shown in Figures 1 and 2. On the righthand end of the shaft 7 is an impeller 12. The casing 6 is filled with oil which is free to circulate to all parts of the casing. The impeller 12 drives this oil in the direction indicated by the arrow shown in Figure 3, which indicates that the oil travels to the right and up through a tubular passageway 13 at the top of which are port openings 14 and 15 on one side thereof and port openings 16 and 17 on the other side thereof. These port openings are controlled by a tubular sleeve valve 18 which in turn is moved by a rod or handle 19 that extends out through the top of the casing.

When the valve 18 is in the lowest position, the ports 14 and 16 will be closed and the oil will pass up through the sleeve and will pass out through the ports 15 and 17 and when the valve is in the highest position the ports 15 and 17 will be closed and the oil will then pass out through the ports 14 and 16. The oil passes both to the right and left at the top of the passageway 13. Opposite the ports 17 and 16 are two turbines 20 and 21, and opposite the ports 14 and 15 are the turbines 22 and 23.

Figure 4:
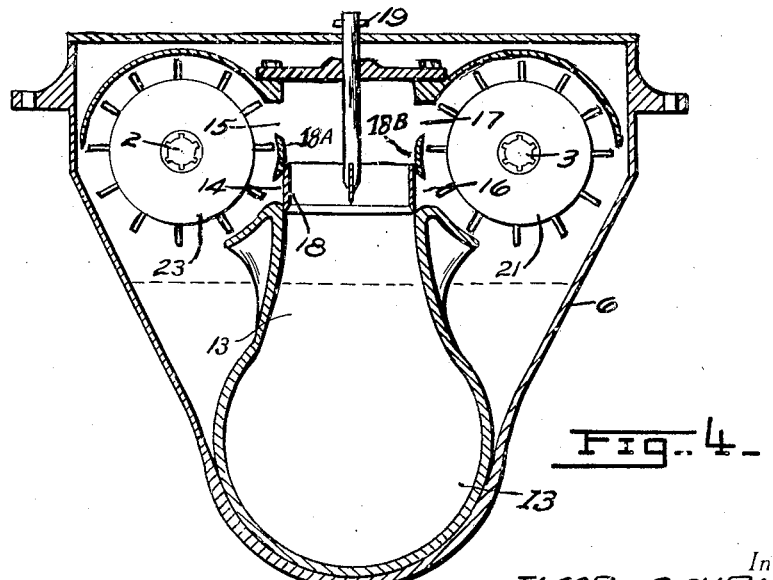
Figure 4 is a section on the line 4x, 4x of Figure 3.

In any case there will be a clearance between the turbines 20, 21, 22, 23 and the casing or housing in which they revolve, and some of the liquid under pressure will leak through this clearance. The flow of this liquid will be sufficient to start the turbine in the right direction. As shown in Figure 4, the valve 18 closes the lower ports 14 and 16 and leaves the upper ports 15 and 17 open. Between the partitions 18A and 18B and the turbines 20, 21, 22, 23 the clearance is very small, much smaller than the clearance between the turbines 20, 21, 22, 23 and the rest of the casing or housing. This permits the liquid to leak in the proper direction to insure the turbines turning with it. The filling and emptying of the pockets of the turbines as they revolve insures the development of power just as it does in an undershot or overshot wheel.

The turbines 21 and 23 drive the rear shafts 3 and 2 respectively and the turbines 20 and 22 drive the front shafts 5 and 4 respectively. The turbines 20 and 21 are contained in and rotate in the same section of the gear casing but are free to turn independently of each other, although as a matter of fact they always turn in the same direction and substantially at the same angular velocity, or nearly so. Likewise the turbines 22 and 23 are contained in the same section of the gear casing but are free to turn independently of each other, although as a matter of fact they always turn in the same direction and at substantially the same angular velocity, or nearly so.

When the valve 18 is in its lowest position as shown in Figure 4 the turbines will turn in the direction to drive the car forward and when the valve 18 is in its upper position the turbines will turn in the reverse direction and drive the car backwards.

The shafts 2 and 3 will turn in opposite directions to drive the car forward as can be seen from the gearing by which their power is transmitted to the wheels. The shaft 2 drives the wheel 26 the shaft 3 drives the wheel 27, the shaft 4 drives the wheel 28 and the shaft 5 drives the wheel 29. As already explained each of these shafts and the wheels driven thereby turn independently of the other shafts and the wheels, although they are all turning at the same time in unison with each other and at substantially the same angular velocity. The power of each shaft is communicated to its wheel through the beveled gears shown in Figure 2.

The impeller 12 which applies the power to the oil is shown in detail in Figures 9 and 10. As shown in Figure 9, the impeller has four blades thereon 61, 62, 63, and 64 each of which is flared like the blade of a fan. On the forward edge of each of these blades a small blade 66, 67, 68, and 69 is pivoted each of which acts as a valve and is used for the purpose of making larger or smaller the opening between the trailing edge of one blade and the forward edge of the next blade. Assuming that the diameter of the impeller shown in Figure 9 is eight inches, each of the valves 66, 67, 68 and 69 will be about three inches long and one inch or more wide. The width of the openings between the blades 61, 62, 63, and 64 would never be less than about one inch when the valves were in so-called closed position. When the valves were fully open, the width of the openings between the blades would be about one and three-quarter inches. With the same angular velocity of the impeller, the more the valves 66, 67, 68, and 69 are opened the more liquid will go through the openings between the blades of the impeller 12 and the greater will be its driving power even with a lower pressure on the liquid. As the speed of the impeller increases, the driving power of it also will increase because pressure and volume increase faster than the liquid passes through the turbines. If the valves 66, 67, 68, and 69 are opened, or the speed of the impeller is increased, or both, more liquid will flow in the direction of the arrow under pressure, thereby increasing the driving power of the impeller on the turbines. It will also be understood that the liquid at rest normally stands at a level just below the turbines, which level is indicated by the dotted line in Figure 4. These valves are all connected to a ring 65 which is moved along the shaft 7 toward or away from the impeller 12 for the purpose of closing the valves or permitting them to open. The ring 65 is moved by the arm 70 shown in Figure 8. The lower ends of the arm 70 engage in bearings 71 and 72 shown in Figures 3 and 8. This arm 70 carries anti-friction rollers 73 and 74 which normally push the ring 65 to the right in Figure 3 and close the valves in the impeller. The normal tendency of the ring is to move to the left in Figure 3 as the impeller is rotated and open the valves. The upper end of the arm 70 is moved to the right or left as follows.

This arm 70 is forked at the upper end and each side of the fork is slotted as shown at 75 and 76. A centrifugal governor 77 is provided which has a gear 78 positively connected thereto at one end and a gear 79 located at the other end. The gear 78 meshes with a gear 80 keyed on the shaft 4 and the gear 79 meshes with the gear 81 keyed on the shaft 5. The ball governor is driven by the gear 78. As the governor turns, the balls fly out and this draws the gear 78 to the right. The gear 78 rotates on a collar 84 that is keyed to the shaft 85. This collar has a flange 86 thereon. When the gear 78 moves to the right, it makes frictional contact with the collar 86 and this in turn causes the shaft 85 to turn. The shaft 85 has a thread on the right hand end that engages a nut 88. The nut 88 has trunnions which extend into the slots 75 and 76 of the fork, on which the nut can swing. As the shaft 85 turns, it draws the nut 88 to the left in Figures 3 and 5 and this in turn moves the arm 70 back so as to permit the ring 65 to move away from the impeller 12 and open the valves. This increases the driving effect of the impeller because it allows more oil to pass through the impeller. This causes the car to go faster.

As the shaft 85 continues to turn the nut 88 continues to move to the left until it presses against the collar 91 and pushes on the sleeve 90 and pushes the pins 92 on the ends of the sleeve 90 through openings in the collar 86 and against the gear 78. This pushes the gear 78 away from the collar 86 and out of frictional contact with it so that the turning of the shaft 85 stops, leaving the nut 88 in the position indicated, with the arm 70 moved to the left at the top in Figure 3 and with the ring 65 moved away from the impeller. When this position is reached, the governor is in equilibrium and the speed of the car will remain uniform. When the car slows down, the balls of the governor come together and push the collar 82 to the right. The collar 82 in turn pushes the gear 79 to the right into frictional contact with the collar 91. The gear 79 is driven by the gear 81 and rotates idly on the sleeve 90, when out of contact with the collar 91.

When it makes contact with the collar, the effect of it is to turn the shaft 85 in the opposite direction, which causes the nut 88 to move to the right and this in turn causes the ring 65 to move toward the impeller and close the valves. The sleeve 90 is splined on the shaft 85, slots 92' being provided in the sleeve which engage with the pin 93 on the shaft. These slots limit the endwise movement of the sleeve 90 on the shaft 85.

In Figure 10 I have shown a detail view of the collar and impeller in which a tongue 95 is shown on the impeller that engages with the slot 96 on the ring by which the ring is positively rotated by the impeller at the same angular velocity and is yet left free to move toward and away from the impeller. On the ring are provided cam shaped recesses 97 in each of which engages a projection on the end of one of the valves so that as the ring moves toward or away from the impeller, the valves are swung to close them or permitting them to open.

The ring 65 is moved forward by the governor as the speed of the turbines changes.

The practical operation of my invention is as follows.

Assuming that the car is standing still, the engine is started and this in turn drives the impeller 12. At this time the valves 66, 67, 68, and 69 will be in so-called closed position because the turbines and the governor are not turning. The impeller 12 delivers liquid under pressure to the turbines 20, 21, 22, and 23 and causes them to turn with an increasing angular velocity until the power developed by the turbines in driving the car equals the power delivered to them through the liquid driven by the impeller. As the speed of the turbines 20, 21, 22, and 23 increases, more liquid will pass through them. Because of the increase in speed the governor 70 operates to permit the valves 66, 67, 68, 69 on the impeller 12 to open, thereby causing the impeller to feed more liquid. If the angular velocity of the impeller 12 is constant, the pressure at which it drives the liquid will drop, but if the engine drives the impeller with an increasing angular velocity, the pressure will be maintained on the liquid even though the valves 66, 67, 68, 69 open further and further and a larger volume is driven by the impeller in consequence.

At a constant pressure the liquid that goes through the turbines will be approximately in proportion to the speed of the turbines. As the speed of the turbines 20, 21, 22, 23 increases, more liquid must be delivered to them. As the car speeds up on level ground, the turbines 20, 21, 22, 23 must turn faster and more liquid must be fed to the turbines to make them turn faster. If the impeller 12 is rotated at a constant angular velocity, the turbines and the car will soon reach a constant speed which balances the driving power of the engine and impeller at that velocity. If higher speed of the car is desired, the speed of the engine and impeller must be increased, thereby increasing the volume of the liquid and raising the pressure. As the speed of the turbines and governor 70 drops, less liquid will pass through the turbines, and this in turn will cause the impeller to raise the pressure of the liquid and this increase in pressure will be aided by the closing of the valves 66, 67, 68, 69 more or less by the operation of the governor.

As the speed of the impeller increases, the quantity of the liquid delivered thereby will increase as well. As the valves 66, 67, 68, 69 are opened, with the impeller at constant speed the quantity of liquid will be increased, and while the pressure may drop, the increase in quantity will actually increase the power delivered. As the speed of the car increases, the valves will open, thus increasing the quantity of liquid fed to the turbines. If the car slows up, as for instance in going up hill, the turbines will slow up and the governor will slow up too, and the governor will then operate to close the valves 66, 67, 68, 69 more or less, cutting down the quantity of liquid fed but increasing the pressure and increasing the driving power on the turbines.

As the car speeds up on level ground, the turbines must turn faster and more liquid must be fed to the turbines to make them turn faster. If the impeller is rotated at a constant angular velocity, the car will soon reach a constant speed which absorbs the driving power of the engine and impeller at that velocity. If higher speed of the car is desired, the speed of the engine and impeller must be increased, thereby increasing the volume of the liquid and raising the pressure. As the speed of the turbines increases, the pressure will drop until the impeller is speeded up to deliver the liquid at a faster rate.

It will be understood that the impeller is placed at the bottom of the gear casing and the turbines are placed above the impeller in the gear casing, and as the oil is discharged from the turbines it runs back by gravity to the bottom of the gear casing, where it can be used over again by the impeller for the purpose of driving the turbines.

I claim:

1. An automobile drive consisting of a gear casing having oil therein, a passageway therein, an impeller at one end of said passageway adapted to drive oil through said passageway, a pair of turbines at the other end of said passageway and on opposite sides thereof, adapted to be driven by the oil, the casing being adapted to return the oil to the impeller outside of the passageway, a shaft adapted to drive the impeller, a shaft driven by each of said turbines and extending through the gear casing, gearing by which each of said driven shafts drives a wheel of the automobile, said impeller having blades thereon with openings between them, a valve on one edge of each of said blades, means for partially opening and closing said valves to vary the flow of oil through said impeller.

2. An automobile drive consisting of a gear casing having oil therein, a passageway therein, an impeller at one end of said passageway adapted to drive oil through said passageway, a pair of turbines at the other end of said passageway and on opposite sides thereof, adapted to be driven by the oil, the casing being adapted to return the oil to the impeller outside of the passageway, a shaft adapted to drive the impeller, a shaft driven by each of said turbines and extending through the gear casing, gearing by which each of said driven shafts drives a wheel of the automobile, said impeller having blades thereon with openings between them, a valve on one edge of each of said blades, a ring concentric with the impeller and movable toward and away from it to shift the valves, a governor adapted to move the ring to close the valves, said governor being driven from one of the shafts driven by a turbine.

3. An automobile drive consisting of wheels capable of being driven on an auto, a shaft for driving each wheel, a turbine on each shaft adapted to be driven by a stream of oil, a rotary impeller and shaft for driving the oil against the turbines, said turbines and impeller being connected by a tube, a gear casing surrounding said turbines and impeller and tube, the oil being driven by the impeller through the tube against the turbines, and being returned to the impeller outside of the tube and inside of the gear casing, said turbines being placed above the normal level of the oil in the gear casing, said shafts being all parallel within the gear casing.

4. An automobile drive consisting of wheels capable of being driven on an auto, a shaft for driving each wheel, a turbine on each shaft adapted to be driven by a stream of oil, or rotary impeller and shaft for driving the oil against the turbines, said turbines and impeller being connected by a tube, a gear casing surrounding said turbines and impeller and tube, the oil being driven by the impeller through the tube against the turbines, and being returned to the impeller outside of the tube and inside of the gear casing, said impeller being placed below the normal level of oil in the gear casing, said shafts being all parallel within the gear casing.

5. An automobile drive consisting of two wheels on an auto, a shaft for driving each wheel, a turbine on each shaft adapted to be driven by a stream of oil, a rotary impeller and shaft for driving the oil against the turbines, a casing surrounding the impeller and the turbines, a passageway in said casing through which the impeller drives the oil against the turbines, said impeller being at the bottom of the casing, and said turbines being placed above the impeller, the oil being held in the gear casing and being returned by gravity from the turbines to the impeller outside of said passageway, said shafts being all parallel within the gear casing.

6. An automobile drive consisting of two wheels on an auto, a shaft for driving each wheel, a turbine on each shaft adapted to be driven by a stream of oil, a rotary impeller and shaft for driving the oil against the turbines, a casing surrounding the impeller and the turbines, a passageway in said casing through which the impeller drives the oil against the turbines, said impeller being at the bottom of the casing, and said turbines being placed above the impeller, the oil being held in the gear casing and being returned by gravity from the turbines to the impeller outside of said passageway, a governor for regulating the amount of oil driven by said impeller, a shaft on which said governor is carried, said governor and shaft being carried above the normal oil level in said casing, said governor being driven from one of the shafts driven by a turbine.

7. An automobile drive consisting of a gear casing, a power shaft extending into the casing near the top, having a gear wheel thereon inside of the casing, a second gear driven thereby lower down in the casing, a shaft on one end of which said second gear is mounted, a rotary impeller on the other end of the shaft, a tube inside of said gear casing in which said impeller rotates, said tube having the shape of an elbow, turbines and turbine shafts driven thereby at the upper end of said tube, oil contained in said gear casing which is driven by said impeller through said elbow and said turbines, said oil being returned to the impeller by said gear casing outside of and around said tube, said shafts being all parallel within the gear casing.

8. An automobile drive consisting of four wheels on an auto, a shaft for driving each wheel, a turbine on each shaft adapted to be driven by a stream of oil, a rotary impeller for driving the oil against the turbines, said impeller having blades thereon with openings between them, a valve on one edge of each of said blades, means for partially opening and closing said valves to vary the flow of oil through said impeller.

9. An automobile drive consisting of four wheels on an auto, a shaft for driving each wheel, a turbine on each shaft adapted to be driven by a stream of oil, a rotary impeller for driving the oil against the turbines, said impeller having blades thereon with openings between them, a valve on one edge of each of said blades, and means for partially opening and closing said valves to vary the flow of oil through said impeller, said means including a ring concentric with the impeller and movable toward and away from it to shift the valves, a governor adapted to move the ring towards the impeller to close the valves, said governor being driven from one of the shafts driven by one of said turbines.

JACOB SCHRAG.